(12) United States Patent
Grundei

(10) Patent No.: US 7,111,711 B2
(45) Date of Patent: Sep. 26, 2006

(54) VIBRATION DAMPER WITH STROKE-DEPENDENT DAMPING FORCE

(75) Inventor: Manfred Grundei, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/780,354

(22) Filed: Feb. 17, 2004

(65) Prior Publication Data
US 2005/0034944 A1  Feb. 17, 2005

(30) Foreign Application Priority Data
Feb. 21, 2003 (DE) .............................. 103 07 363

(51) Int. Cl.
F16F 9/48 (2006.01)
(52) U.S. Cl. ................. 188/288; 188/313; 188/322.15; 188/322.22
(58) Field of Classification Search ................ 188/281, 188/282.1, 282.3, 282.5, 282.6, 282.8, 283, 188/288, 313, 316, 317, 322.13, 322.14, 188/322.15, 322.18, 322.22
See application file for complete search history.

(56) References Cited

U.S. PATENT DOCUMENTS

| | | | |
|---|---|---|---|
| 4,821,850 A | | 4/1989 | Geiling et al. |
| 5,398,786 A | | 3/1995 | Mintgn |
| 5,477,589 A | * | 12/1995 | Lan ................................ 16/51 |
| 5,655,633 A | * | 8/1997 | Nakadate et al. ........ 188/266.6 |
| 5,657,511 A | * | 8/1997 | Lan ................................ 16/51 |
| 5,887,857 A | * | 3/1999 | Perrin ...................... 267/64.12 |
| 5,971,117 A | * | 10/1999 | Grundei et al. ............. 188/288 |
| 5,975,258 A | * | 11/1999 | Nezu et al. ............ 188/322.15 |

FOREIGN PATENT DOCUMENTS

| | | |
|---|---|---|
| AT | 172 400 | 9/1952 |
| DE | 100 31 975 | 2/2002 |
| FR | 2.088.644 | 1/1972 |
| GB | 1 238 508 | 7/1971 |
| GB | 2 231 385 | 11/1990 |

* cited by examiner

Primary Examiner—Devon C. Kramer
(74) Attorney, Agent, or Firm—Cohen, Pontani, Lieberman & Pavane

(57) ABSTRACT

Vibration damper, containing a damping medium-filled cylinder, in which a piston rod with a piston is installed with freedom of axial movement, where, as a function of the stroke of the piston, a bypass connects a working space on the piston rod side to a working space on the side away from the piston rod, the two spaces being separated from each other by the piston, where the piston has at least one through-channel for at least one flow direction, the outlet side this channel being at least partially covered by at least one valve disk, so that a surface is present on the valve disk upon which pressure can act in the opening direction of the disk, where, in addition to the said pressure-actuated surface, the valve disk also has a second pressure-actuated surface, which is separated from the first when the valve disk is closed and which can be put into action by the bypass, so that the effects of the two pressure-actuated surfaces are added to each other.

26 Claims, 11 Drawing Sheets

VIBRATION DAMPER WITH STROKE-DEPENDENT DAMPING FORCE

BACKGROUND OF THE INVENTION

1. Field of the Invention

The invention pertains to a vibration damper with stroke-dependent damping force of the type including a piston separating two working spaces, a pair of through channels covered by disks which open to connect the working spaces when acted on by pressure, and a bypass arrangement which connects the working spaces as a function of the stroke of the piston, i.e. when the piston is in a limited range of positions.

2. Description of the Related Art

A piston-cylinder assembly with distance-dependent performance characteristics is known from U.S. Pat. No. 5,971,117. The piston rod of the piston-cylinder assembly carries two pistons a certain distance apart, each of which can produce a damping force in both directions of piston rod movement. At least one bypass groove, which is longer in the axial direction than the distance between the piston rings of the two pistons, is formed in the cylinder of the piston-cylinder assembly. Thus three characteristic curve regions are produced. When the two pistons are in the stroke range where the bypass groove is located, the damping force is determined by the cross section of the bypass groove. As the stroke of the piston rod increases, one of the pistons travels out of the bypass region, and an intermediate characteristic is obtained. As soon as the second piston has also left the region of the bypass groove, the stiffest damping force characteristic goes into effect. For a vibration damper of this type with variable performance, however, two pistons with at least four valve disks and possibly valve springs are required. This expense can be too great for one or another concrete application.

SUMMARY OF THE INVENTION

The object of the present invention is to simplify the design of the vibration damper with stroke-dependent damping force characteristics so that it can be produced at lower cost.

According to the invention, this task is accomplished in that the valve disk has not only a first pressure-actuated surface, but also a second pressure-actuated surface which is separated from the first surface when the valve disk is closed, and which can be put into action via the bypass, so that the effects of the two pressure-actuated surfaces are added to each other.

The advantage is that, in comparison with a damping force characteristic with an advanced opening region determined by the bypass, the valve disk will open sooner, and therefore a more comfortable connection to the chassis is obtained overall, especially at high piston rod velocities.

So that the bypass can be designed and produced easily, it is formed as a groove. The bypass groove can have an inlet area and/or an outlet area. The effective cross-sectional ratios of the bypass groove make it possible for the pressure to change continuously at the second pressure-actuated surface, so that pressure surges, which could lead to the abrupt opening or closing of the valve, are avoided. The bypass groove can be formed by an area of the cylinder with an expanded diameter, this expansion passing all the way around the inside circumference of the cylinder.

According to another aspect of the design simplification, the valve disk has its own sealing sleeve, which extends at least from the pressure-actuated surface on the valve disk toward the associated working space. The damping force characteristic can be determined by the length of the valve sleeve relative to the length of the bypass.

So that it can operate in a defined manner, the sealing sleeve is provided with a seal acting in the direction of the cylinder. In addition, the gap between the wall of the cylinder and the sealing sleeve is larger than that between the piston and the cylinder, so that any dimensional deviations within the completed valve can be compensated. A larger gap between the sealing sleeve and the cylinder reduces the throttling effect inside the gap and improves the desired axial movement of the sealing sleeve to the same extent.

The piston with its through-channels for both flow directions is therefore very easy to manufacture, because the minimum of one through-channel for the one flow direction of the damping medium is separated by concentrically arranged valve seating surfaces of the minimum of one through-channel for the other flow direction, where the width of the first pressure-actuated surface is determined by the two concentric valve seating surfaces. The valve seats can be in the form of elevations on the valve disk or in the form an elevation on the piston. The advantage of having the valve seats on the valve disk is that a different damping force characteristic can be obtained simply by replacing the valve disk, which is much less expensive than replacing the piston to achieve the same goal.

The problem of providing a channel leading to the additional pressure-actuated surface can be solved very easily by designing the second pressure-actuated surface so that it extends radially outside the valve seating surfaces provided for the valve disks.

So that the vibration damper realizes the desired stroke-dependent damping force characteristic in both the inward and outward travel directions of the piston rod, a nonreturn valve is installed between the assigned working space and a connection leading to the second pressure-actuated surface; this valve is blocked in the direction of the flow arriving at the second pressure-actuated surface.

To facilitate assembly, it is helpful for the valve disk and the sealing sleeve to constitute a single part. It is also possible, however, for the sealing sleeve and the valve disk to be separate parts. So that the sealing sleeve will occupy a defined operating position, a spring is provided to pretension the sealing sleeve against the valve disk.

If it is desired to ensure that, in the case of a symmetric arrangement of the bypass groove with respect to the stroke of the piston, the desired effect of the second pressure-actuated surface will begin at the correct time in both directions of movement from the normal position, the distance between the effective sealing edges of the piston ring and the seal in the sleeve should be equal to or less than the length of the bypass groove.

It is also possible to obtain three stroke-dependent damping force characteristics by pretensioning the sealing sleeve by means of a separate spring toward its assigned valve disk, where the characteristic of the spring is selected in such a way that, after a defined stroke position has been reached, the sealing sleeve can rise from the valve seat as the stroke continues in the direction of the elastic force of the spring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
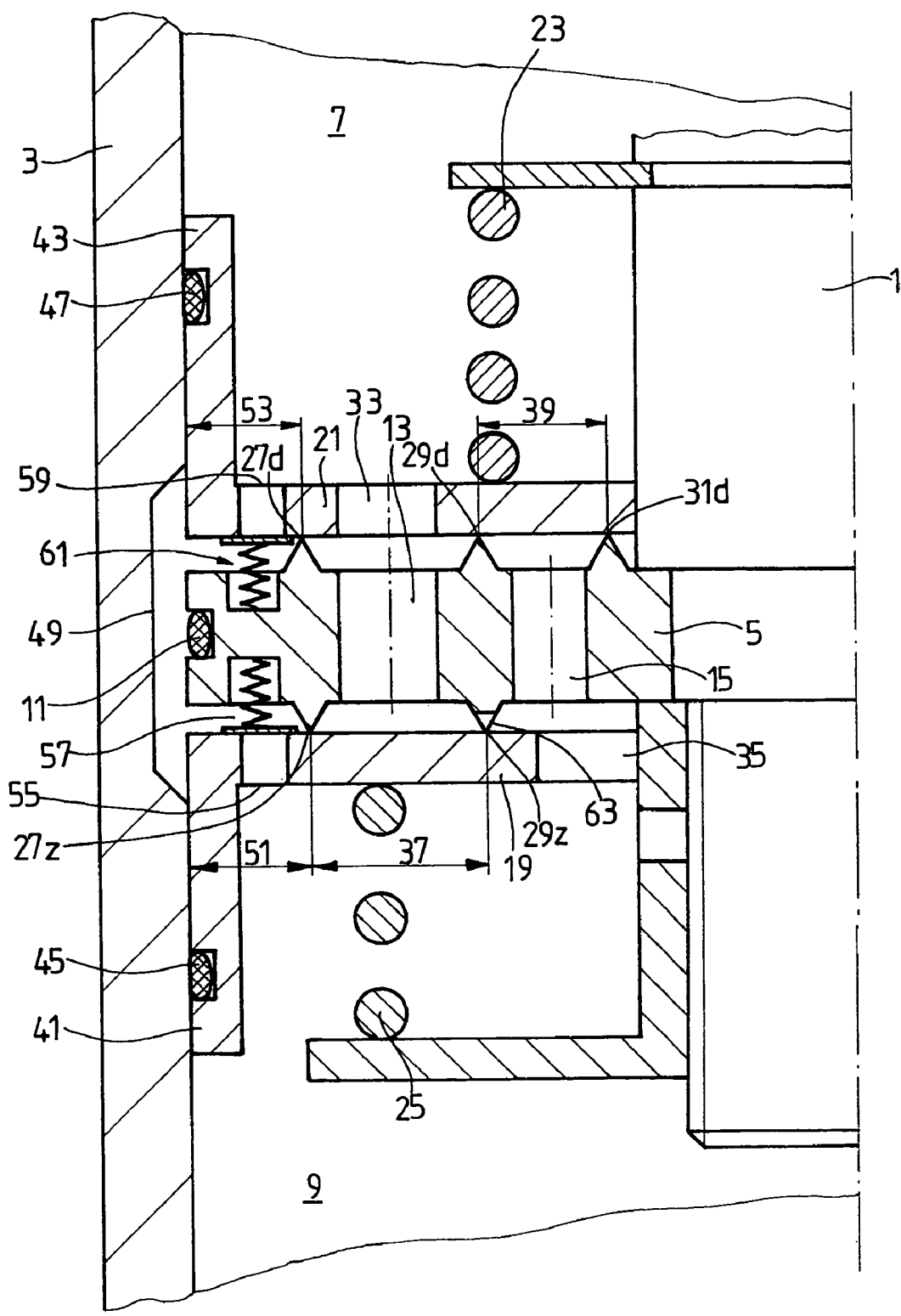
FIG. 1 shows a vibration damper according to the invention with two damping force characteristics.

FIG. 1 shows a section of a vibration damper of arbitrary design in the area of the central stroke position of a piston rod 1 relative to a cylinder 3. The piston rod 1 carries a piston 5, which divides the cylinder into a working space 7 on the piston rod side and a working space 9 on the side away from the piston rod. A piston ring 11 is mounted in the lateral surface of the piston. Inside the piston, at least one through-channel 13 is provided for the outward travel of the piston rod, and at least one through channel 15 is provided for the inward travel of the rod. The outlet side of the through-channel 13 is covered by a valve disk 19, and that of the through-channel 15 is covered by a valve disk 21. The valve disks are pretensioned onto the valve seating surfaces 27d, 29d, 31d and 27z, 29z by valve springs 23, 25. Inside the valve disk 21 there is a connecting opening 33 in flow alignment with the through-channel 13, and in the valve disk 19 there is a connecting opening 35 aligned with the through-channel 15.

The valve seating surfaces 27z; 29z define a first, circular ring-shaped pressure-actuated surface 37 on the bottom of the valve disk, "bottom" being defined relative to the outward-travel direction of the piston rod; the pressure acting on this surface is exerted against the valve spring 25. In a corresponding manner, the valve seating surfaces 29d, 31d function as boundaries for the first pressure-actuated surface 39 in the inward travel direction of the piston rod.

A sealing sleeve 41, 43 is made as an integral part of each of the two valve disks 19, 21; each sleeve carries a seal, referred to below as a sealing sleeve seal 45, 47, extending toward the wall of the cylinder a certain distance away from the plane of the valve disk.

Inside the cylinder, a bypass in the form of at least one bypass groove 49 is formed, the effective length of which relative to movement in one direction is preferably smaller than the distance between the piston ring and the sealing sleeve seals 45, 47.

In addition, each of the two valve disks 19, 21 also has a second pressure-actuated surface 51, 53, one for each direction of movement, these surfaces being located in a defined position on the valve disks between the valve seating surfaces 27d, 27z and the wall of the cylinder 1. A connection 55, which is itself closed by a nonreturn valve 57 acting against the pressure-actuated surface 51, is machined through the valve disk 19. In the valve disk 21 there is also a connection 59, which is blocked by a nonreturn valve 61 acting against the pressure-actuated surface 53.

In the exemplary diagram, the effective length of the bypass groove 49 starting from the normal position is approximately half as long as the distance between the effective sealing edges of the piston ring 11 and the sealing sleeve seals 45, 47.

As soon as the piston rod starts to move outward, the damping medium in the working space 7 on the piston rod side is compressed and flows through the connecting opening 33 into the through-channel 13. In parallel, the nonreturn valve 61 opens and thus releases a flow path through the bypass groove to the bottom surface of the valve disk 19. The sealing effect of the piston ring is cancelled out by the bypass groove. As a function of the speed at which the piston rod moves, a backpressure builds up at the first pressure-actuated surface 37 and at the second pressure-actuated surface 51 of the valve disk 19; this backpressure tries to lift the valve disk 19 away from the valve seating surfaces 27z; 29z. The sealing sleeve seal 45 prevents the medium from bypassing the sealing sleeve 41 via a gap between the sealing sleeve and the wall of the cylinder. Before the valve disk 19 has been lifted away from the valve seating surfaces, a small advance opening cross section 63 inside the valve seating surface 29z can establish a connection between the working spaces and exert a relatively small damping force. This type of advanced opening cross section can also be provided in, for example, the valve seating surfaces 27d, 29d. When the sum of the forces acting against the first pressure-actuated surface 37 and the second pressure-actuated surface 51 becomes greater than the closing force of the valve spring 25, the valve disk 19 will rise from the valve seating surfaces 27z, 29z. Thus a first damping force characteristic, which tends to make the ride more comfortable, is obtained, and it lasts until the piston ring 11 reaches the upper end of the bypass groove 49 and is thus no longer hydraulically bridged. The second pressure-actuated surface 51 is thus no longer available to produce force. At this point, the damping force characteristic is therefore determined by the first pressure-actuated surface 37 alone.

When, starting from the normal position, the piston rod travels inward toward the working space 9 on the side away from the piston rod, the corresponding valve components behave in the same way. Thus the damping medium can flow from the working space 9 via the connecting opening 35 inside the valve disk 19 and into the through-channel 15, and at the valve disk 21 it will strike the first pressure-actuated surface 39, which extends between the two valve seating surfaces 29d, 31d. In parallel, the nonreturn valve 57 of the connection 55 in the valve disk 19 is opened. In contrast, the nonreturn valve 61 is closed, which allows the second pressure-actuated surface 53 to go into action, this effect being superimposed additively on the effect of the first pressure-actuated surface 39. In this position of the piston, the sealing sleeve seal 47 is located outside the bypass groove 49. The advanced opening cross section 63 is also available for this direction of movement, allowing damping medium to flow from the working space 9 on the side away from the piston rod to the working space 7 on the side of the piston rod.

When the piston ring 11 reaches the bottom end of the bypass groove 49, only the first pressure-actuated surface 39 is again available to the further movement of the piston rod. When the valve disk 21 is lifted, the damping medium can escape from the through-channel 15 via the valve seating surface 29d and pass through the connecting opening 33 to the working space 7 on the piston rod side.

Figure 2:
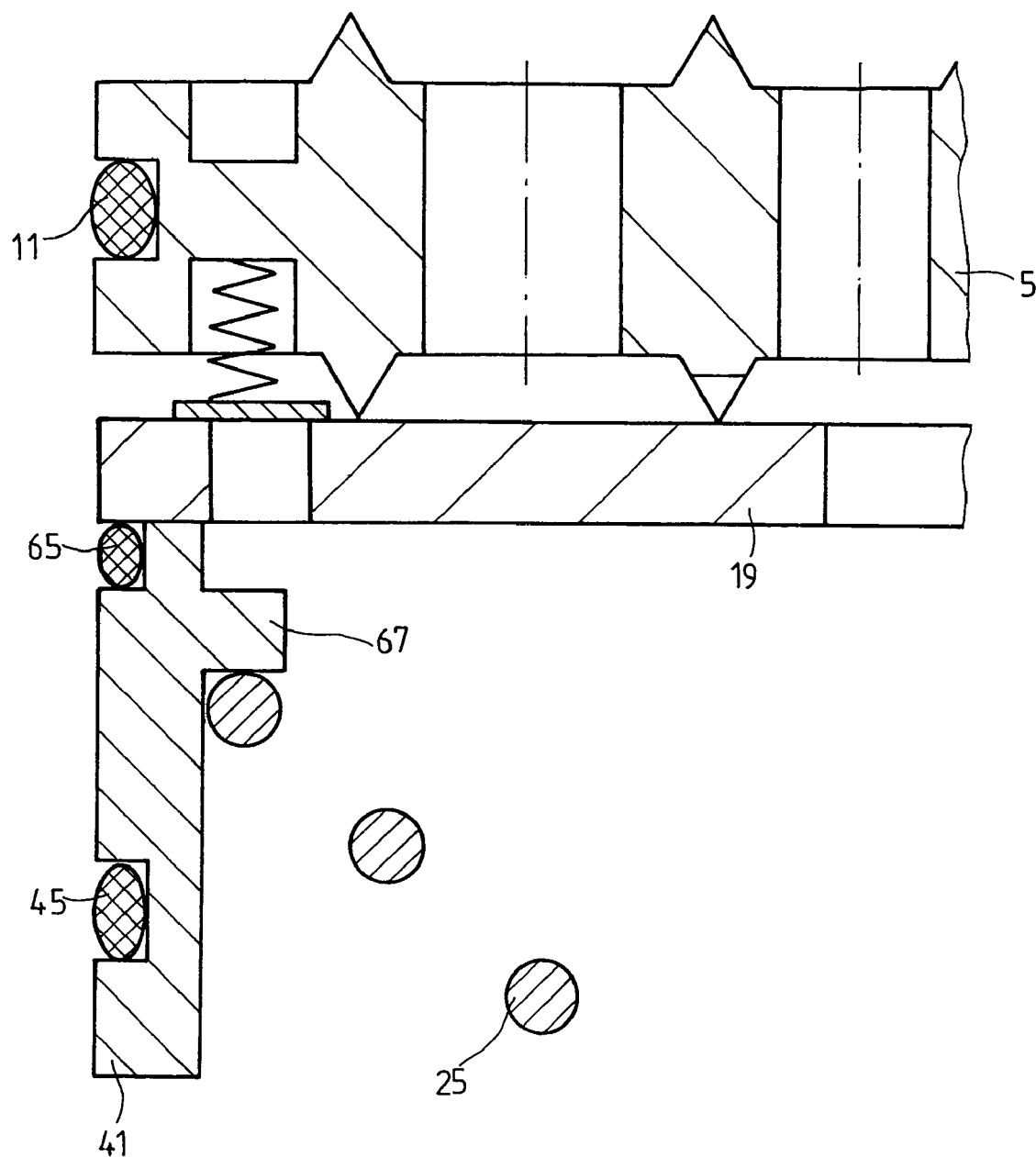
FIG. 2 shows a modification of the piston in FIG. 1.

FIG. 2 shows only a part of the damper according to FIG. 1 and is intended to illustrate a simplified design for the sealing sleeves 41, 43. In FIG. 1, the sealing sleeves 41, 43 are integral parts of the valve disks 19, 21. In FIG. 2, these units are separated into their two sub-components, i.e. sealing sleeves and valve disks. A ring-shaped seal 65 can then be inserted between the associated end surface of the sealing sleeve 41, 43 and the valve disk 19, 21, and the valve spring 23, 25 can then act on the sealing sleeve to ensure a reliable connection between the sealing sleeve and the valve disk. For this purpose, the sealing sleeve has a radially inward-extending shoulder 67.

Figure 3:
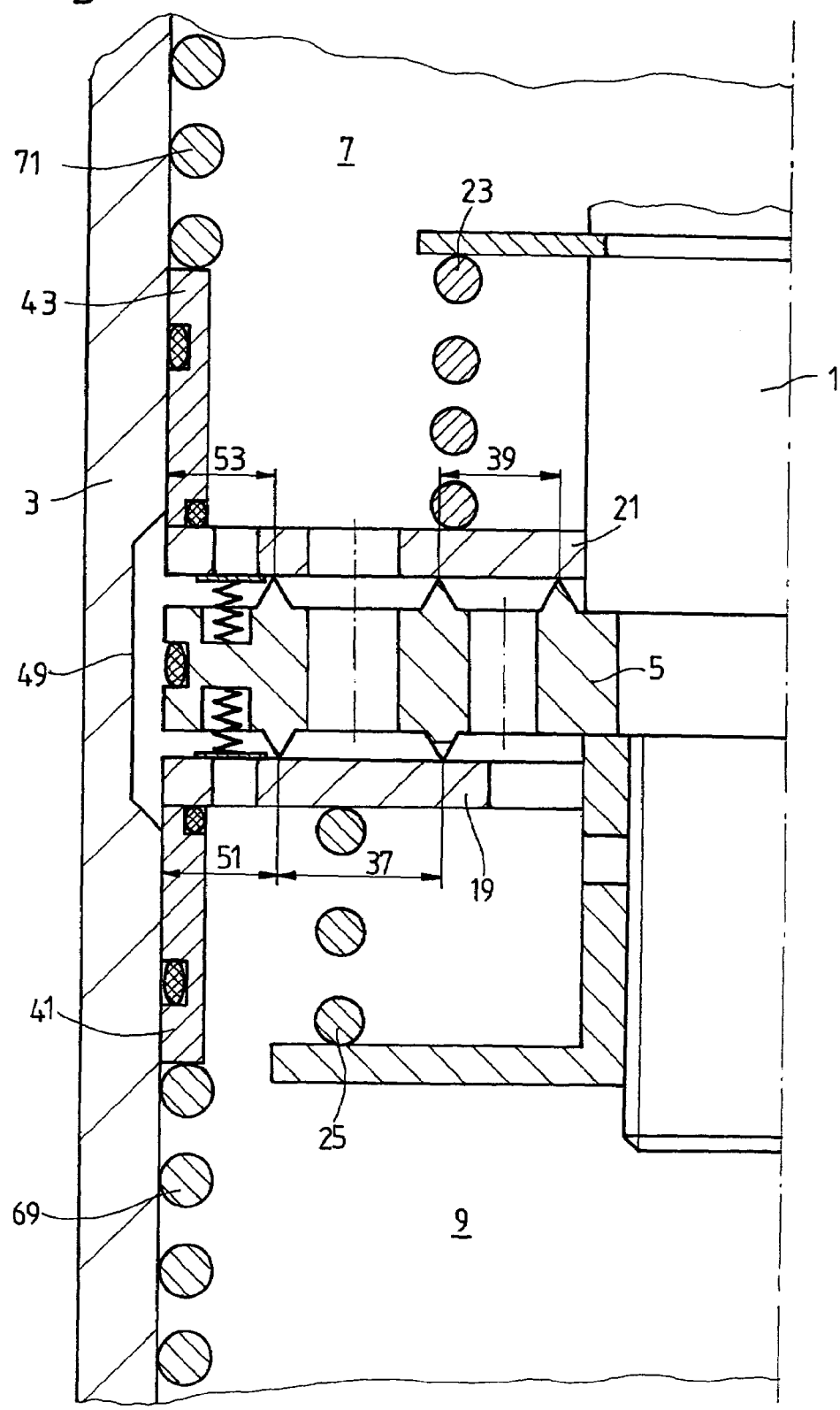
FIG. 3 shows a vibration damper with three damping force characteristics.

FIG. 3 shows a variant similar to FIG. 1. The difference here is that sealing sleeves 41, 43 are used, which, although they represent separate components and function in the same way as those of FIG. 2, are tensioned by springs 69, 71, which are supported against components which are stationary in the axial direction with respect to the cylinder 1, e.g., a piston rod guide (not shown). In addition, the spring characteristic of the springs 69, 71 is selected in such a way that the hydraulically tight contact between the end surface of the sealing sleeve 41, 43 and the associated valve disk 19, 21 is released when the piston 5 and thus also the valve disks 19, 21 reach a certain stroke position.

The operating behavior of a vibration damper according to FIG. 3 is the same as that described on the basis of FIG. 1 as long as the sealing sleeves 41, 43 are in contact with the valve disks 19, 21.

Figure 4:
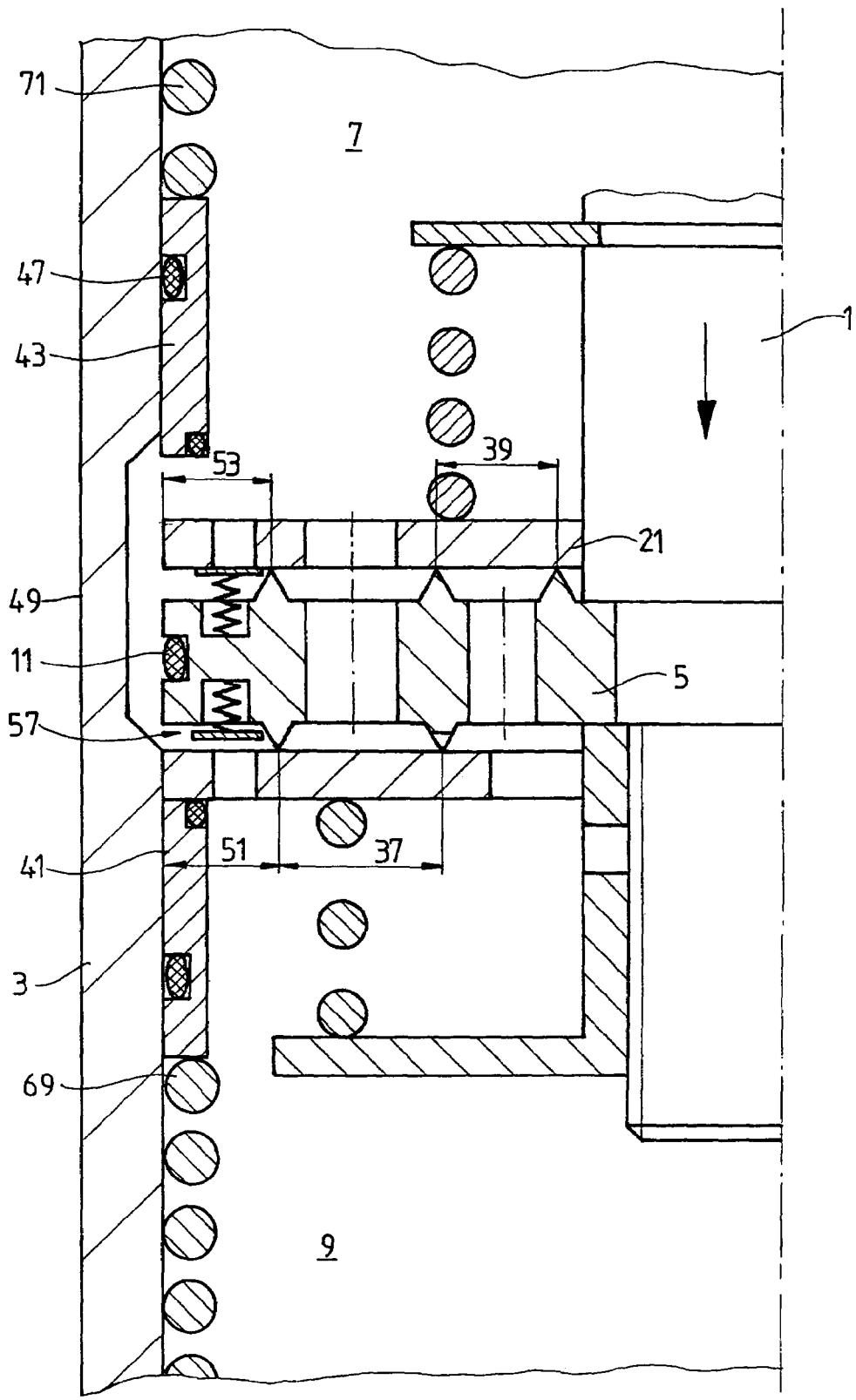
FIGS. 4 and 5 show vibration dampers according to FIG. 3 during the inward travel of the piston rod.

FIG. 4 shows the position of the valve parts of the piston according to FIG. 3 during an inward travel movement, after the stroke of the piston has taken it away from the normal position, but the piston ring 11 on the piston 5 is still inside the bypass groove 49. The nonreturn valve 57 is open, and the sealing sleeve 43 is no longer in contact with the valve disk 21. The spring 71 is completely relaxed. The sealing sleeve 43 can be connected to the spring 71 in any desired way, or it can be held in position by the frictional force between the sealing sleeve seal 47 and the cylinder 33. As a result, a flow route via the bypass groove 49 is now available. The additive effect of the pressure-actuated surface 53 is not available. The damping force characteristic at the moment in question consists of the components of the damping effect of the bypass groove 49 and that of the first pressure-actuated surface 39. During this movement of the piston, the sealing sleeve 41 is pushed together with the piston 5 against the force of the spring 69.

Figure 5:
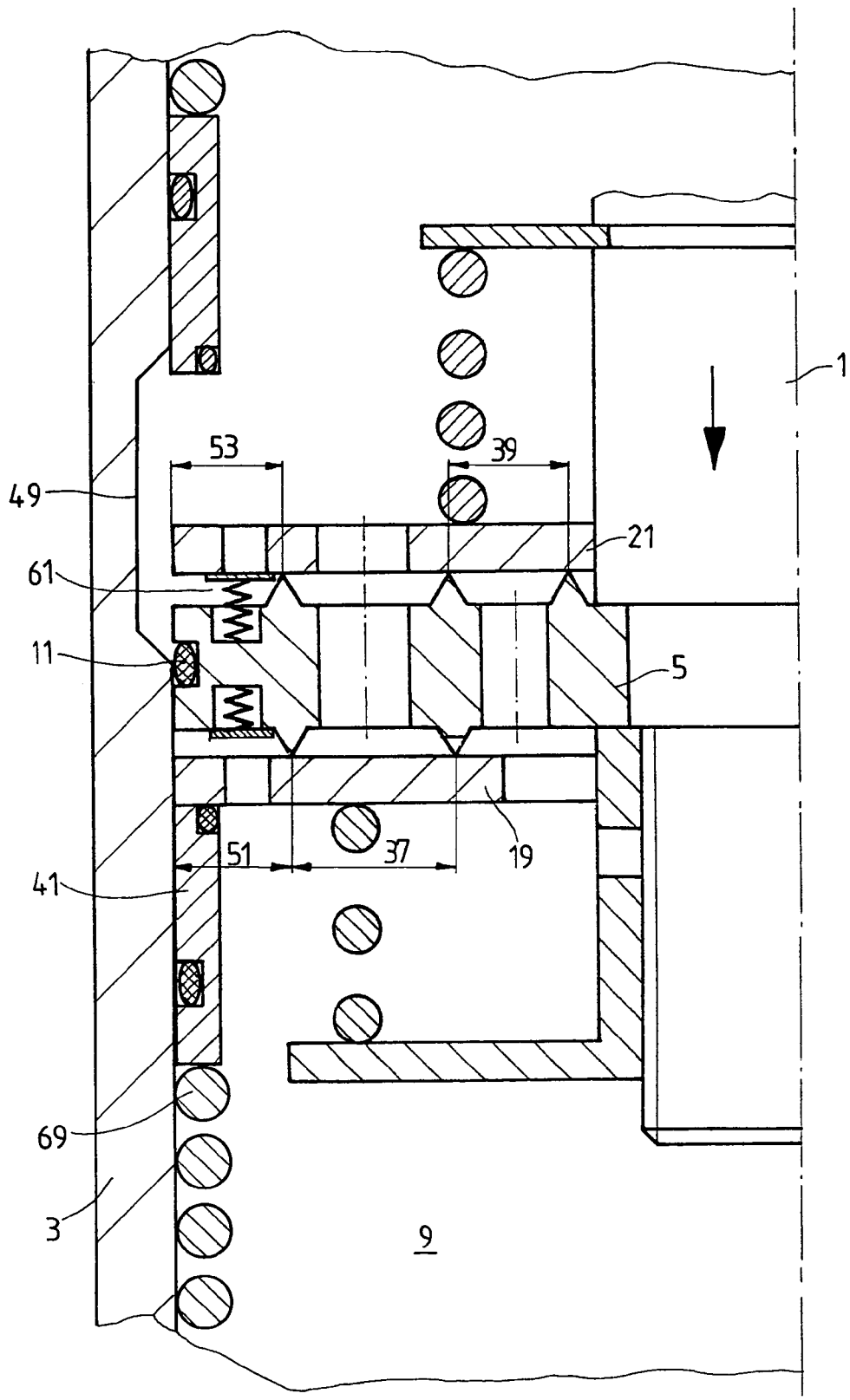

In FIG. 5, the piston 5 is in a stroke position in which the piston ring 11 is no longer inside the bypass groove 49 and is thus able to perform a sealing function. The second pressure-actuated surface 53 is separated from the flow arriving from the working space 9 and therefore is unable to exert any force on the valve disk 21. Starting from this stroke position, the size of the first pressure-actuated surface 39 determines the opening behavior of the valve disk 21.

When, starting from the position of the piston shown in FIG. 5, the stroke direction of the piston rod 1 changes to the outward travel direction, the piston ring is still acting outside the bypass groove 49, so that, even though the nonreturn valve 61 is now open, only the first pressure-actuated surface 37 on the valve disk 19 determines the damping force. The sealing sleeve 41 is kept in position by the spring 69, so that, when the piston ring 11 enters the area of the bypass groove 49 again, both pressure-actuated surfaces 37, 51 are able to act on the valve disk 19. Thus the damping force behavior described in conjunction with FIG. 3 is restored.

Figure 6:
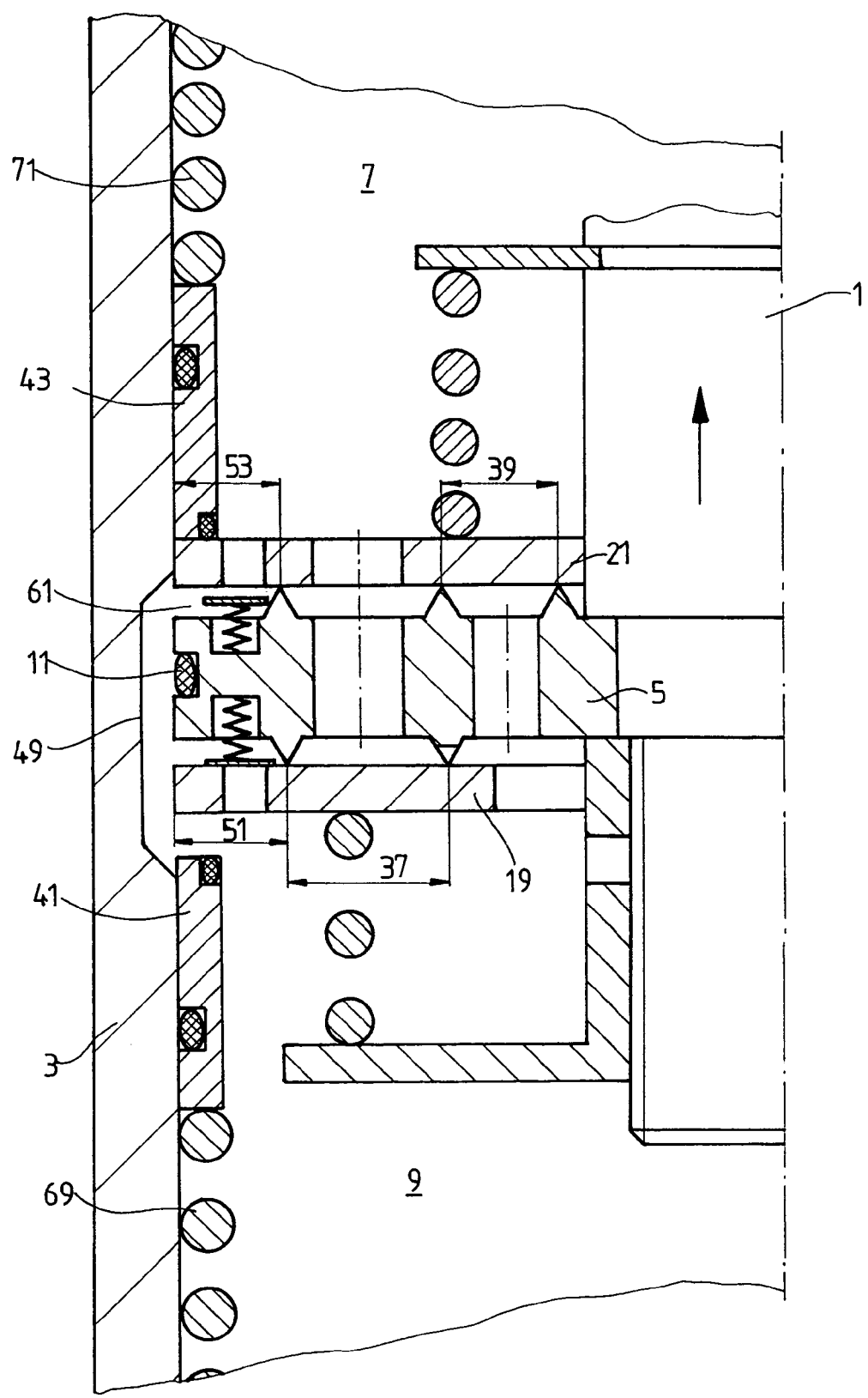
FIGS. 6 and 7 show vibration dampers according to FIG. 3 during the outward travel of the piston rod.

FIG. 6 shows how the piston valve functions when the piston rod 1, starting from FIG. 3, travels outward. For as long as the piston ring 11 is still within the bypass groove 49 and the sealing sleeve 41 is still in contact with the valve disk 19, the softest damping force characteristic is present, because both pressure-actuated surfaces 37, 51 are available to the force trying to open the valve disk 19 (see FIG. 3). Because the nonreturn valve 61 is open, it is irrelevant to the damping force characteristic whether the sealing sleeve 43 is in contact with the valve disk 21 or not. In FIG. 6, the piston has traveled out so far that the sealing sleeve 41 has reached its end position and is thus no longer in contact with the valve disk 19.

The nonreturn valve 61 is open now, so that the damping force characteristic in effect at this point is determined by the bypass groove 49, by the advanced opening cross section 63, and by the first pressure-actuated surface 37.

Figure 7:
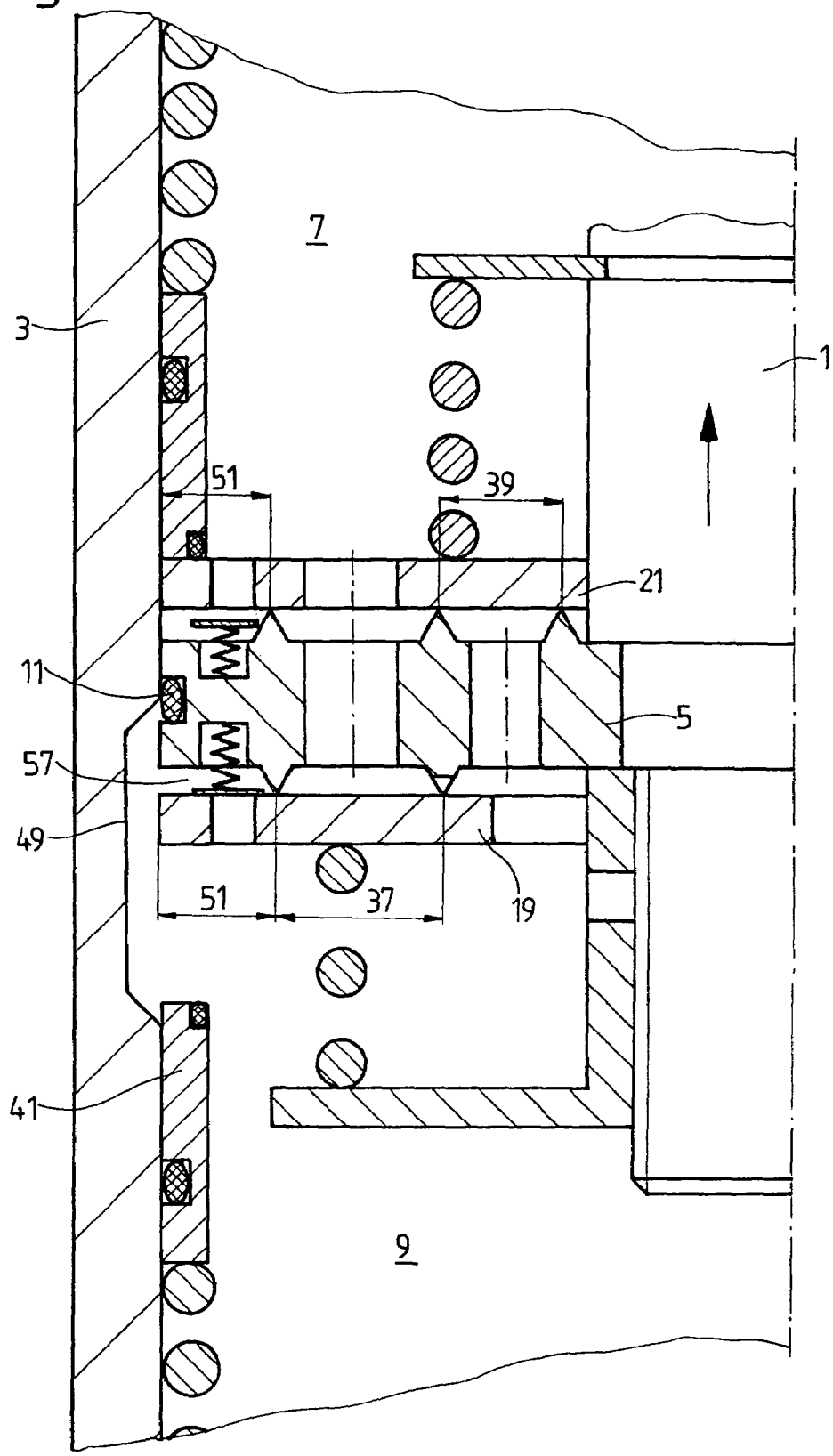

Then, as the piston rod continues to travel outward, the stroke position according to FIG. 7 is reached, in which the piston ring 11 is outside the bypass groove 49 and is able to perform its sealing function. Only the first pressure-actuated surface 37 is available in the opening direction of the valve disk 19.

During the inward travel of the piston rod from its position corresponding to FIG. 7, it is true that the nonreturn valve 57 opens, but its switching position has no influence as long as the piston ring 11 has still not reached the bypass groove 49. The damping force here is determined again only by the first pressure-actuated surface 39 on the valve disk 21. When the piston ring 11 reaches the stroke area of the bypass groove 49 again, the damping force characteristic according to FIG. 3 is back in effect, again independently of the position of the sealing sleeve 41 at this moment, because the nonreturn valve 57 opens when the piston rod 1 travels inward.

In the designs according to FIGS. 1–7, a tight seal is always required between the sealing sleeve, i.e., the sealing sleeve seal, and the cylinder so that the first pressure-actuated surface can be actuated. FIGS. 8–14b are now intended to show that a sufficient pressure gradient Δp at the valve disk can also be used to achieve an effective lifting behavior.

Figure 8:
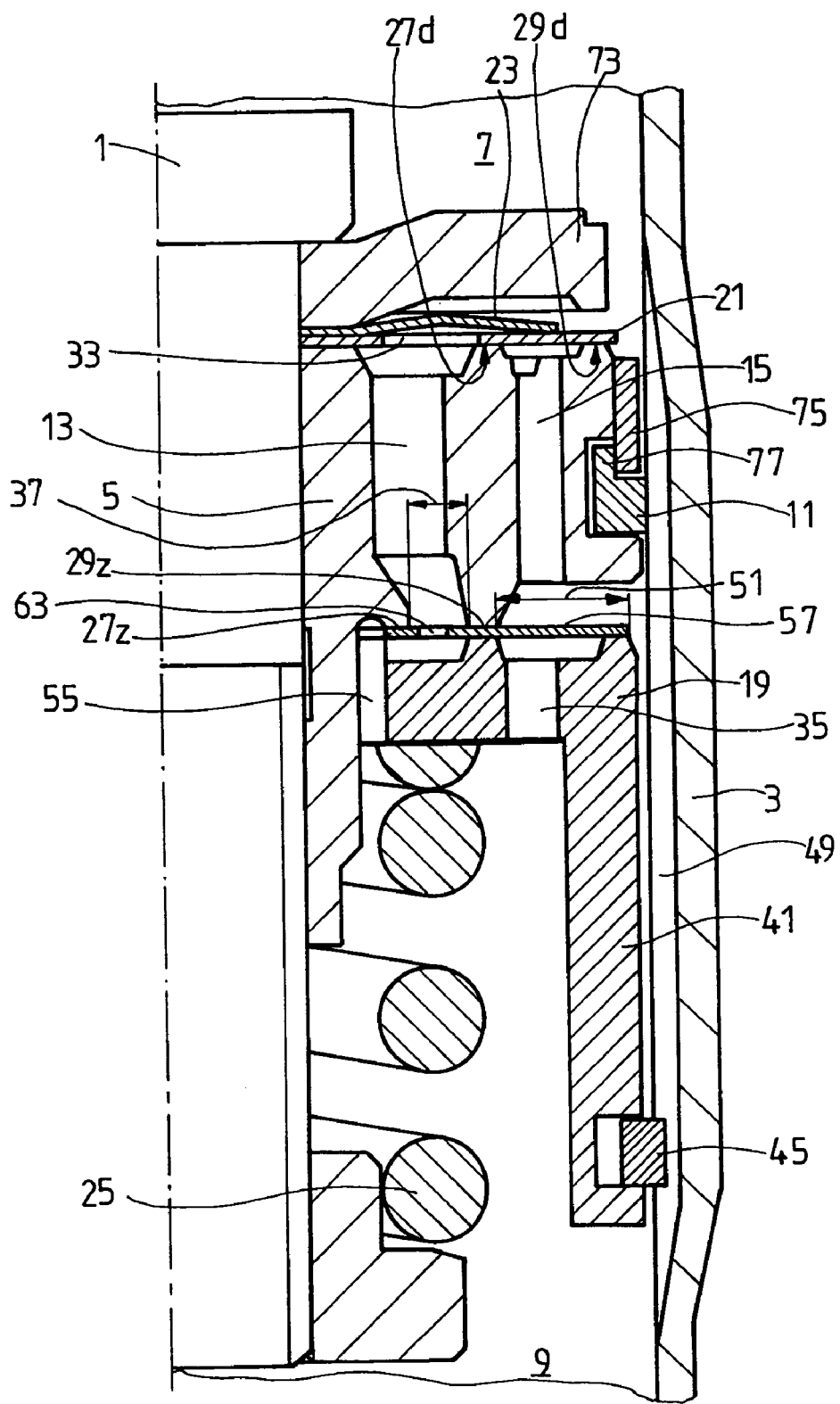
FIG. 8 shows a modification of the piston with through-channels on a small pitch circle.

In FIG. 8, the through-channel 13 in the piston 5 for the movement of the piston rod 1 in the outward travel direction is located on a smaller pitch circle than the minimum of one through-channel 15 for the movement of the piston rod in the inward direction. The valve disk 19 is again provided with a nonreturn valve 57, which is supported on the piston-side valve seating surfaces 27z, 29z. As in preceding figures, the two valve seating surfaces on the piston again have the result of creating first and second pressure-actuated surfaces 37, 51. The nonreturn valve 57 covers the connecting opening 35. The inside diameter of the valve disk 19 and a piston fastening nut form the connection 55, through which the displaced damping medium can escape from the through-channel 13 for the outward travel of the piston rod into the working space on the piston rod side. The minimum of one opening 63 inside the nonreturn valve 57 serves as the advanced opening cross section. The nonreturn valve is centered with respect to the piston by webs on the inside diameter. In practice, the webs form the beginning of the connection 55 of the valve disk.

On the top surface of the piston, the valve disk 21 is pretensioned by a star spring, which serves here as the valve spring 23, and has at least one connecting opening 33. A support ring 73 limits the lifting movement of the valve disk 21. It is impossible for the diameter of the piston ring 11 to increase radially toward the outside beyond a certain extent, because a clamping ring 75 on the lateral surface of the piston forms a stop for a shoulder 77 on the piston ring 11. The sleeve seal 45, however, can easily expand radially within certain limits.

Figure 9A:
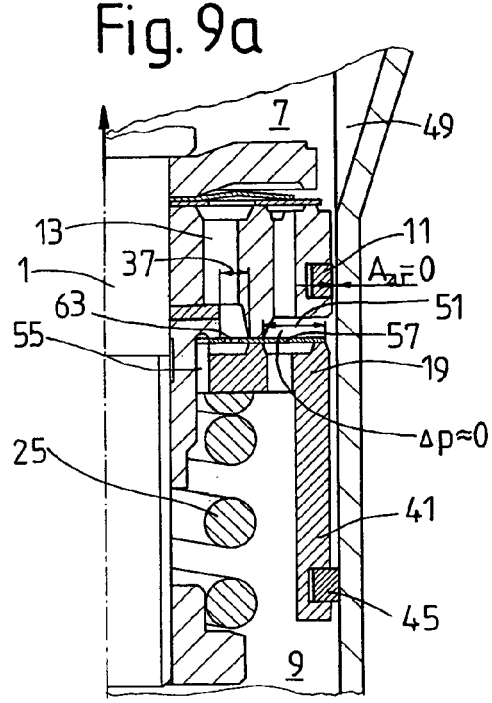
FIGS. 9a–14b show the damping force behavior of a piston according to FIG. 8.

FIG. 9*a* shows the piston of FIG. 8 with a simplified drawing of the piston ring 11 in a position underneath the bypass groove 49. The piston ring 11 prevents the damping medium from passing through from the working space 7 on the piston rod side to the second pressure-actuated surface 51 when the piston rod travels outward. Thus there is no pressure difference Δp between the top and the bottom in the area of the second pressure-actuated surface, and therefore there is no pressure which could exert an opening force against the closing force of the valve spring 25. Therefore, only the first pressure-actuated surface 37 is acting in the opening direction on the valve disk 19.

Figure 9B:
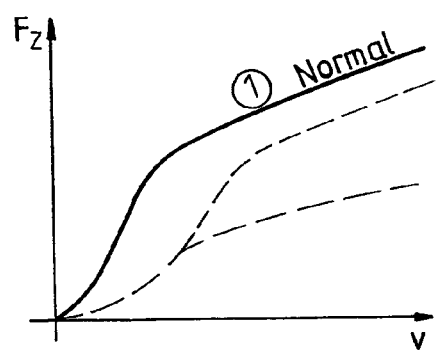

Thus the damping force characteristic according to FIG. 9*b* is obtained, which is to be considered the "normal characteristic" in the further discussion below. With this normal characteristic, the greatest damping forces, comparatively speaking, are achieved in the outward travel direction of the piston rod 1 at a certain speed of outward travel. At a slower speed of outward travel, only the advanced opening cross section 63 inside the nonreturn valve 57 is in effect. The damping medium can escape—the valve disk 19 being open—from the minimum of one through-channel 13 and through the connection 55 to the working space 9 on the side away from the piston rod.

Figure 10A:
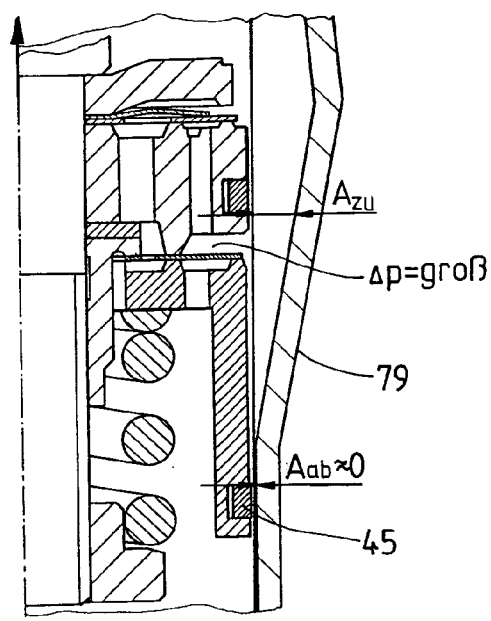
Figure 10B:
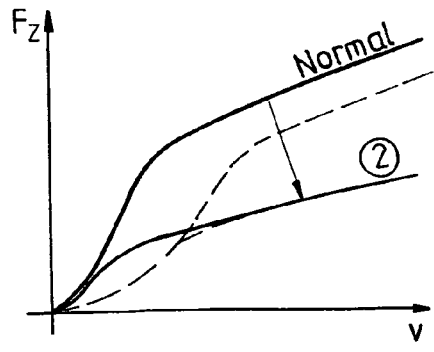

In FIG. 10*a*, the piston ring 11 reaches a lead-in bevel 79 leading to the bypass groove 49. The sleeve seal 45 closes the gap $A_{out}$ between the sealing sleeve 41 and the inside wall of the cylinder 1. In contrast, the inflow cross section $A_{in}$ in the area of the piston ring 11 becomes larger in the area of the bypass groove with its lead-in bevel 79. As a result, the pressure gradient Δp at the valve disk 19 in the area of the second pressure-actuated surface 51 increases continuously, so that a soft opening behavior is obtained. The damping medium can escape radially inward even if the valve disk 19 rises only slightly and can thus help to influence the part of the characteristic curve associated with the advanced opening cross section. Thus the damping force characteristic 2 according to FIG. 10*b* is obtained, which gives a much more comfortable ride.

Figure 11A:
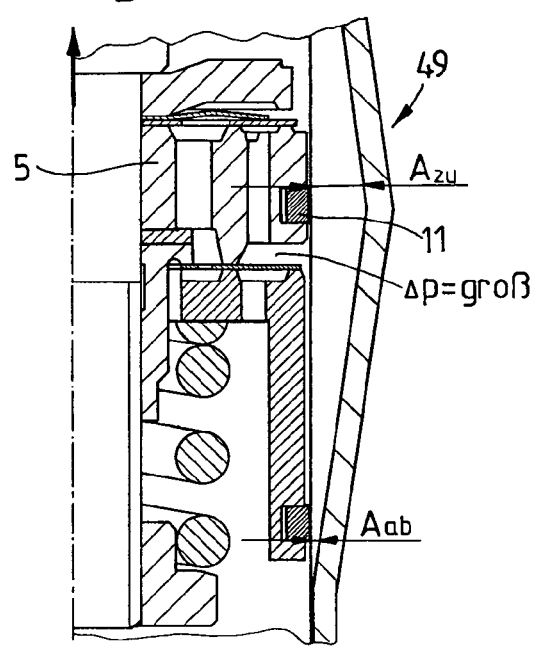

In FIG. 11*a*, the piston 5 with its piston ring 11 is located in an area of the bypass groove 49 which has a very large inflow cross section $A_{in}$. Here, the sleeve seal again releases only a very small gap $A_{out}$ between the sealing sleeve and the inside wall of the cylinder. Thus, a larger advanced opening cross section is obtained, consisting of the minimum of one opening 63 in the nonreturn valve 58 (FIG. 8) and the cross section $A_{out}$. In the damping force characteristic 3 according to FIG. 11*b*, this change makes itself evident through a softer damping force characteristic in the range of slower piston rod velocities v and also through smaller damping forces at higher piston rod velocities. This can be explained by the very large pressure gradient Δp, which is especially large because of the area ratios $A_{in}/A_{out}$, and by the correspondingly large opening forces acting on the second pressure-actuated surface.

Figure 12A:
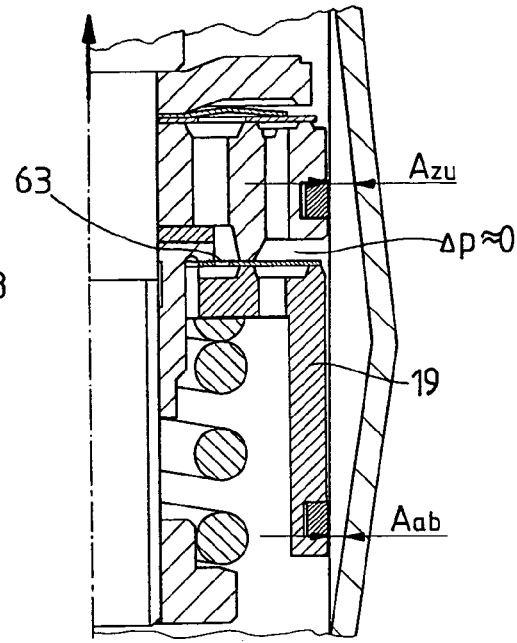
Figure 11B:
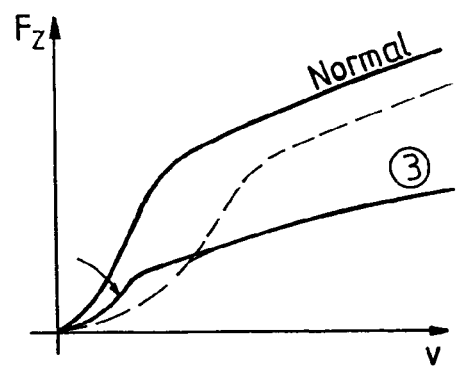
Figure 12B:
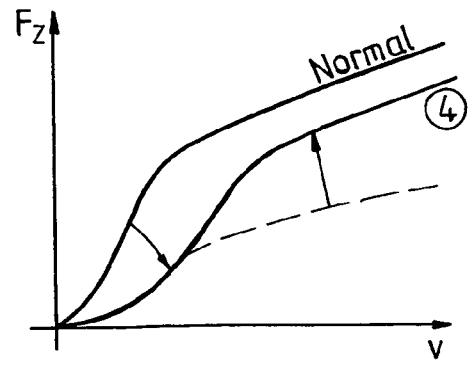

In FIG. 12*a*, the cross sections $A_{in}$ and $A_{out}$ are approximately the same in size. Only a negligible pressure gradient Δp is present at the valve disk 19. The influence of the opening force on the second pressure-actuated surface is correspondingly low, whereas there is a significant increase in the size of the advanced opening cross sections $63+A_{out}$. The achievable damping force in characteristic 4 of FIG. 12*b* is lowered again at slow piston rod velocities v, whereas the damping forces which are determined by the opening behavior of the valve disk 19 increase.

Figure 13A:
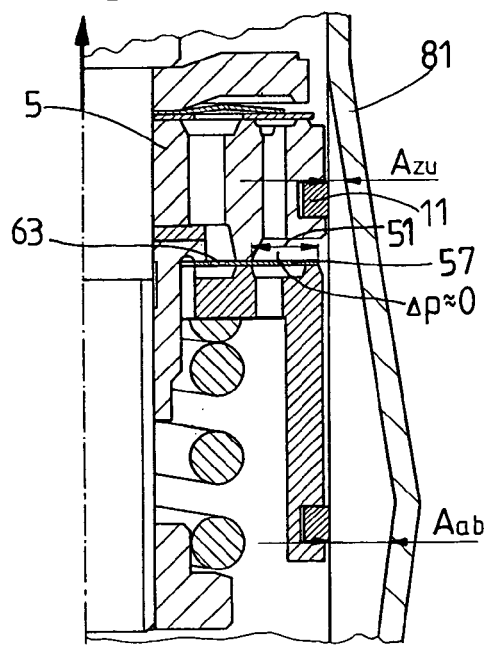

FIG. 13*a* shows the piston with its piston ring 11 in the outlet area 81 of the bypass groove 49. The cross section $A_{in}$ is much smaller than the cross section $A_{out}$. The effective advanced opening cross section is now determined by the opening 63 in the nonreturn valve and by the cross section $A_{in}$. This entire advanced opening cross section, however, is again smaller than that present in FIG. 12*a*. Thus the damping force characteristic necessarily rises. In addition, the ratio $A_{in}/A_{out}$ and thus the pressure gradient Δp clearly fall, so that the influence of the second pressure-actuated surface 51 decreases also. Overall, the damping force characteristic rises to the level of damping force characteristic 5.

Figure 14A:
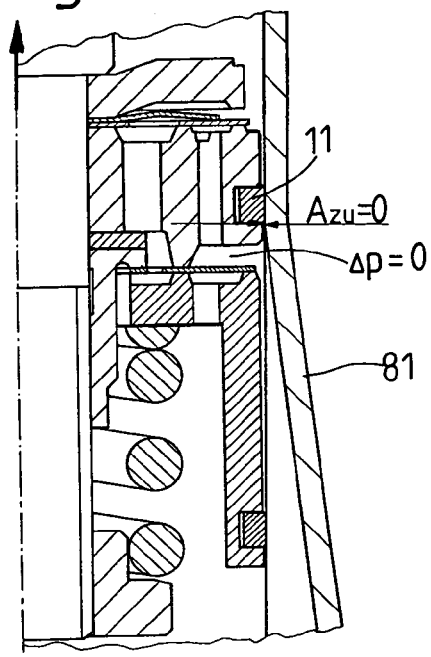
Figure 13B:
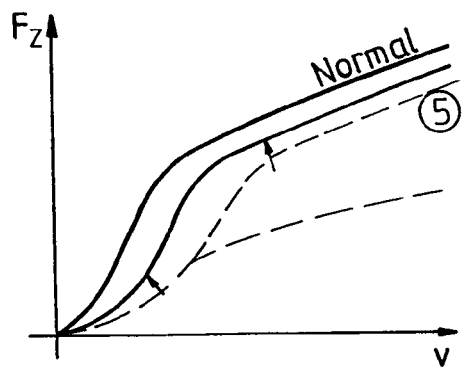
Figure 14B:
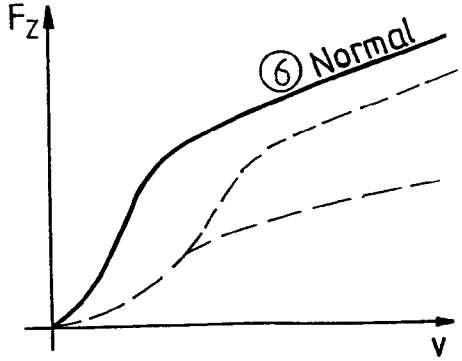

In FIG. 14*a*, the piston ring 11 has left the outlet area 81 of the bypass groove 49. $A_{in}$ has thus fallen to practically zero, whereas $A_{out}$ still presents a significant cross section. A pressure gradient Δp is not present, so that the second pressure-actuated surface 51 is not available for the opening behavior. The advanced opening cross section is also determined only by the nonreturn valve, so that damping force characteristic 6 corresponds again to the normal characteristics according to FIG. 9*b*. As can be concluded from an overall consideration of FIGS. 9*b*–14*b*, it is possible to determine the actuation points of the two pressure-actuated surfaces 51 by appropriate selection of the designs of the cross sections $A_{in}$ and $A_{out}$. The axial dimension of the sealing sleeve 41 is less important. As a result of the inlet and outlet areas 77, 81 of the bypass groove 49, the second pressure-actuated surface 51 does not become available suddenly; on the contrary, a continuously increasing or decreasing pressure gradient Δp develops. The valve disk never moves very quickly, and therefore it produces no noise.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:

a cylinder containing a damping medium;

a piston rod extending from said cylinder;

a piston connected to said piston rod, said piston having a piston rod side and a side away from said piston rod, said piston separating said cylinder into a working space on said piston rod side and a working space on said side away from said piston rod;

a bypass connecting said working spaces when said piston is in a limited range of positions;

at least one first through-channel for flow in a first direction between said working spaces through said piston, each said first through-channel having an outlet side;

a first valve disk covering said outlet side and having a first pressure-actuated surface upon which pressure can act to lift said first valve disk from a closed position to an open position to permit flow in said first direction, and a second pressure actuated surface which is separated from said first pressure-actuated surface when said first valve disk is in said closed position and can be acted on by damping medium flowing in said first direction via said bypass so that the pressure on said first and second pressure actuated surfaces of said first valve disk is additive; and a sealing sleeve received in said cylinder and extending from said first valve disk into the working space on said piston rod side.

2. The vibration damper of claim 1, wherein an inner surface of said cylinder has a groove defining said bypass.

3. The vibration damper of claim 2, wherein said groove comprises an inlet area.

4. The vibration damper of claim 2, wherein said groove compnses an outlet area.

5. The vibration damper of claim 1, said first valve disk and said sealing sleeve are made as a single unit.

6. The vibration damper of claim 1, said first valve disk and said sealing sleeve are made as separate components.

7. The vibration damper of claim 6, further comprising a valve spring pretensioning said sealing sleeve against said first valve disk.

8. The vibration damper of claim 7, wherein said spring has a spring characteristic which is selected so that the sealing sleeve can rise from said first valve disk when the piston reaches a predetermined position.

9. The vibration damper of claim 1, comprising a seal between said sealing sleeve and said cylinder.

10. The vibration damper of claim 9, wherein said bypass has a length and said piston has a sealing ring separated from said seal by a distance which is greater than or equal to the length of the bypass.

11. The vibration damper of claim 1, further comprising a pair of concentrically arranged valve seating surfaces for seating said first valve disk, said valve seating surfaces defining said first pressure actuated surface therebetween.

12. The vibration damper of claim 1, wherein said second pressure-actuated surface lies radially outside of said first pressure-actuated surface.

13. The vibration damper of claim 1, further comprising a nonretum valve which blocks flow of pressure medium in said first direction toward said second pressure actuated surface.

14. The vibration damper of claim 1, further comprising:
at least one second through-channel for flow in a second direction through the piston, each said second through-channel having an outlet side; and a second valve disk covering said outlet side of said second through-channel and having a third pressure-actuated surface which opposes said first pressure-actuated surface and upon which pressure can act to lift the second valve disk from a closed position to an open position to permit flow in said second direction, and a fourth pressure actuated surface which is separated from said third pressure-actuated surface when said second valve disk is in said closed position and can be acted on by damping medium flowing in said second direction via the bypass so that the pressure on said first and second pressure actuated surfaces of said second valve disk is additive.

15. A vibration damper comprising:
a cylinder containing a damping medium;
a piston rod extending from said cylinder;
a piston connected to said piston rod, said piston having a piston rod side and a side away from said piston rod, said piston separating said cylinder into a working space on said piston rod side and a working space on said side away from said piston rod;
a bypass connecting said working spaces when said piston is in a limited range of positions;
at least one first through-channel for flow in a first direction between said working spaces through said piston, each said first through-channel having an outlet side;
a first valve disk covering said outlet side and having a first pressure-actuated surface upon which pressure can act to lift said first valve disk from a closed position to an open position to permit flow in said first direction, and a second pressure actuated surface which is separated from said first pressure-actuated surface when said first valve disk is in said closed position and can be acted on by damping medium flowing in said first direction via said bypass so that the pressure on said first and second pressure actuated surfaces of said first valve disk is additive; and
a pair of concentrically arranged valve seating surfaces for seating said first valve disk, said valve seating surfaces defining said first pressure actuated surface therebetween.

16. The vibration damper of claim 15, wherein an inner surface of said cylinder has a groove defining said bypass.

17. The vibration damper of claim 15, wherein said second pressure-actuated surface lies radially outside of said first pressure-actuated surface.

18. The vibration damper of claim 15, further comprising a nonretum valve which blocks flow of pressure medium in said first direction toward said second pressure actuated surface.

19. The vibration damper of claim 15, further comprising:
at least one second through-channel for flow in a second direction through the piston, each said second through-channel having an outlet side; and a second valve disk covering said outlet side of said second through-channel and having a third pressure-actuated surface which opposes said first pressure-actuated surface and upon which pressure can act to lift the second valve disk from a closed position to an open position to permit flow in said second direction, and a fourth pressure actuated surface which is separated from said third pressure-actuated surface when said second valve disk is in said closed position and can be acted on by damping medium flowing in said second direction via the bypass so that the pressure on said first and second pressure actuated surfaces of said second valve disk is additive.

20. A vibration damper comprising:
a cylinder containing a damping medium;
a piston rod extending from said cylinder;
a piston connected to said piston rod, said piston having a piston rod side and a side away from said piston rod, said piston separating said cylinder into a working space on said piston rod side and a working space on said side away from said piston rod;

a bypass connecting said working spaces when said piston is in a limited range of positions;

at least one first through-channel for flow in a first direction between said working spaces through said piston, each said first through-channel having an outlet side;

a first valve disk covering said outlet side and having a first pressure-actuated surface upon which pressure can act to lift said first valve disk from a closed position to an open position to permit flow in said first direction, and a second pressure actuated surface which is separated from said first pressure-actuated surface when said first valve disk is in said closed position and can be acted on by damping medium flowing in said first direction via said bypass so that the pressure on said first and second pressure actuated surfaces of said first valve disk is additive; and a nonreturn valve which blocks flow of pressure medium in said first direction toward said second pressure actuated surface.

21. The vibration damper of claim 20, wherein an inner surface of said cylinder has a groove defining said bypass.

22. The vibration damper of claim 20, wherein said second pressure-actuated surface lies radially outside of said first pressure-actuated surface.

23. A vibration damper comprising:

a cylinder containing a damping medium;

a piston rod extending from said cylinder;

a piston connected to said piston rod, said piston having a piston rod side and a side away from said piston rod, said piston separating said cylinder into a working space on said piston rod side and a working space on said side away from said piston rod;

a bypass connecting said working spaces when said piston is in a limited range of positions;

at least one first through-channel for flow in a first direction between said working spaces through said piston, each said first through-channel having an outlet side;

a first valve disk covering said outlet side and having a first pressure-actuated surface upon which pressure can act to lift said first valve disk from a closed position to an open position to permit flow in said first direction, and a second pressure actuated surface which is separated from said first pressure-actuated surface when said first valve disk is in said closed position and can be acted on by damping medium flowing in said first direction via said bypass so that the pressure on said first and second pressure actuated surfaces of said first valve disk is additive;

at least one second through-channel for flow in a second direction through the piston, each said second through-channel having an outlet side; and a second valve disk covering said outlet side of said second through-channel and having a third pressure-actuated surface which opposes said first pressure-actuated surface and upon which pressure can act to lift the second valve disk from a closed position to an open position to permit flow in said second direction, and a fourth pressure actuated surface which is separated from said third pressure-actuated surface when said second valve disk is in said closed position and can be acted on by damping medium flowing in said second direction via the bypass so that the pressure on said first and second pressure actuated surfaces of said second valve disk is additive.

24. The vibration damper of claim 23, wherein an inner surface of said cylinder has a groove defining said bypass.

25. The vibration damper of claim 23, wherein said second pressure-actuated surface lies radially outside of said first pressure-actuated surface.

26. The vibration damper of claim 23, further comprising a nonreturn valve which blocks flow of pressure medium in said first direction toward said second pressure actuated surface.

* * * * *